(12) United States Patent
Kollmann

(10) Patent No.: US 6,899,580 B1
(45) Date of Patent: May 31, 2005

(54) MARINE FUEL SYSTEM WITH PELTIER-EFFECT DEVICE

(75) Inventor: Troy J. Kollmann, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/720,823

(22) Filed: Nov. 24, 2003

(51) Int. Cl.$^7$ .............................................. B63H 21/38
(52) U.S. Cl. .................................... 440/88 F; 123/509
(58) Field of Search ........................... 440/88 C, 88 D, 440/88 H, 88 F, 88 HE; 123/509, 510, 514, 123/516, 541, 557

(56) References Cited

U.S. PATENT DOCUMENTS

| | | | |
|---|---|---|---|
| 3,564,860 A | 2/1971 | Reich et al. | ...................... 62/3 |
| 3,635,037 A | 1/1972 | Hubert | .............................. 62/3 |
| 5,174,266 A | 12/1992 | Evdokimo | .................... 23/557 |
| 5,915,626 A | 6/1999 | Awarzamani et al. | ........ 239/135 |
| 6,067,970 A | 5/2000 | Awarzamani et al. | ....... 123/549 |
| 6,253,742 B1 | 7/2001 | Wickman et al. | ........... 123/516 |
| 6,390,871 B1 | 5/2002 | Wickman et al. | ............. 440/88 |
| 6,527,603 B1 | 3/2003 | Wickman et al. | ............. 440/88 |
| 6,553,974 B1 | 4/2003 | Wickman et al. | ........... 123/516 |
| 6,718,954 B2 * | 4/2004 | Ryon | .......................... 123/541 |

* cited by examiner

Primary Examiner—Jesus D. Sotelo
(74) Attorney, Agent, or Firm—William D. Lanyi

(57) ABSTRACT

A marine propulsion device is provided with a thermoelectric device connected in thermal communication with fuel as it flows through the fuel system of an engine. The thermoelectric device can be a Peltier-effect device that uses electric current to cause heat to flow from a cold portion of the Peltier-effect device to a hot portion of the Peltier-effect device. A secondary heat exchanger removes heat from the Peltier-effect device. As a result, heat is removed from the fuel in order to inhibit the creation of a "vapor lock" condition in association with the engine.

20 Claims, 4 Drawing Sheets

MARINE FUEL SYSTEM WITH PELTIER-EFFECT DEVICE

BACKGROUND OF THE INVENTION

1. Field of the Invention

The present invention is generally related to a marine propulsion device with a fuel system and a fuel system cooler and, more particularly, to a marine fuel system that incorporates a Peltier-effect cooling unit to reduce the temperature of fuel as it passes between a fuel storage reservoir, a fuel pumping module, and the engine of the marine propulsion device.

2. Description of the Prior Art

Peltier-effect devices were conceived in 1834. The Peltier-effect occurs whenever current passes through the circuit of two dissimilar conductors. Depending on the direction of the current, this junction of the two conductors will either absorb or release heat. The amount of heat provided is in direct proportion to the current supply. A Peltier-effect device, sometimes referred to as a thermoelectric cooling system, provides a cold junction where energy, in the form of heat, is absorbed by electrons as they pass from a low energy level in a P-type semiconductor element to a higher energy level in a N-type semiconductor element. A power supply provides the energy to move the electrons through the system. At the hot junction, energy is expelled to a heat sink as electrons move from a high energy level N-type element to a low energy level P-type element. Thermoelectric cooling components are made from two elements of the semiconductor, primarily bismuth telluride, which are heavily doped to create either an excess (N-type component) or deficiency (P-type component) of electrons. Heat absorbed at the cold junction is pumped to the hot junction at a rate proportional to current passing through the circuit and the number of cooling couples incorporated in the device.

U.S. Pat. No. 3,564,860, which issued to Reich et al. on Feb. 23, 1971, describes thermoelectric elements utilizing distributed Peltier-effect. A thermoelectric couple for use in a Peltier cooling device includes P-type and N-type thermoelectric elements in which at least one of the thermoelectric elements is formed of a material having varying thermoelectric properties. The Seebeck coefficient (absolute value) of the material adjacent the cold junction is significantly less than the Seebeck coefficient (absolute value) of material adjacent the hot junction. The variance in such properties may be a continuous gradient, or the thermoelectric elements may be made up of discrete segments of different materials bonded together.

U.S. Pat. No. 3,635,037, which issued to Hubert on Jan. 18, 1972, describes a Peltier-effect heat pump. A Peltier-effect pile is mounted in a heat exchanger or heat sink with semi-conductive barrier layers insulating the Peltier electrodes from the metal of the heat sink. The semi-conductive layers are poled electrically or biased to minimize electrical conductivity thereacross but permit maximum heat flow between the Peltier pile and the heat exchange jacket.

U.S. Pat. No. 5,174,266, which issued to Evdokimo on Dec. 29, 1992, describes a fuel temperature control device with thermoelectric modules. The device maintains fuel at a programmable temperature by adding heat to or drawing heat from the fuel as it passes through a heat exchanger. The secondary heat exchanger is used in conjunction with Peltier-effect thermoelectric modules to perform the addition or extraction of heat. A control unit receives fuel temperature signals and generates module electrical control signals to control the amount and direction of heat transfer.

U.S. Pat. No. 6,067,970, which issued to Awarzamani et al. on May 30, 2000, describes a fuel injection device for an internal combustion engine. The device has a fuel injection valve which sprays the fuel in the direction of an inlet valve and includes an electric heating element for the fuel before it reaches an inlet valve. The fuel injection device has a fuel injection valve which sprays the fuel in the form of a fuel jet in the direction of the inlet valve of the internal combustion engine, the fuel jet leaving the fuel injection valve at least in part strikes an electric heating element which, according to the invention, is designed as a Peltier element. The fuel injection device according to the invention is intended, in particular, for mixture-compressing, applied-ignition internal combustion engines.

U.S. Pat. No. 5,915,626, which issued to Awarzamani et al. on Jun. 29, 1999, describes a fuel injector that includes a magnetic coil whose power dissipation is utilized to pre-heat fuel flowing through the fuel injector. The magnetic coil is arranged so that a thermal coupling between the magnetic coil and the fuel flowing through a heat exchanger segment is acquired. In addition, a Peltier element can be arranged between the magnetic coil and the heat exchanger segment. Furthermore, the fuel can also be heated using a heating coil.

U.S. Pat. No. 6,253,742, which issued to Wickman et al. on Jul. 3, 2001, discloses a fuel supply method for a marine propulsion engine. It is a method for controlling the operation of a fuel system of an outboard motor using a lift pump to transfer fuel from a remote tank to a vapor separator tank. Only one level sensor is provided in the vapor separator tank and an engine control unit monitors the total fuel usage subsequent to the most recent filling of the tank. When the fuel usage indicates that the fuel level in the vapor separator tank has reached a predefined lower level, a lift pump is activated to draw fuel from a remote tank and provide that fuel to the vapor separator tank.

U.S. Pat. No. 6,390,871, which issued to Wickman et al. on May 21, 2002, discloses a fuel reservoir mounted to a driveshaft housing of an outboard motor. A fuel system for a marine propulsion system includes a reservoir that defines a cavity in which first and second fuel pumps are disposed. The reservoir is mounted on the marine propulsion system at a location which causes the reservoir to be at least partially submerged within, and in thermal communication with, water in which the marine propulsion system is operated when a propulsor of the marine propulsion system is inactive. The first fuel pump is a lift pump which draws fuel from a fuel tank and pumps the fuel into the cavity of the reservoir. The second fuel pump is a high pressure pump which draws fuel from the cavity and pumps the fuel at a higher pressure to a fuel rail of an engine.

U.S. Pat. No. 6,527,603, which issued to Wickman et al. on Mar. 4, 2003, discloses a fuel delivery system for a marine propulsion device. The system includes a reservoir that defines a cavity in which first and second fuel pumps are disposed. The first fuel pump is a lift pump which draws fuel from a fuel tank and pumps the fuel into the cavity of the reservoir. The second fuel pump is a high pressure pump which draws fuel from the cavity and pumps the fuel at a higher pressure to a fuel rail of an engine.

U.S. Pat. No. 6,553,974, which issued to Wickman et al. on Apr. 29, 2003, discloses an engine fuel system with a fuel vapor separator and a fuel vapor vent canister. A fuel supply system for a marine engine provides an additional fuel chamber, associated with a fuel vapor separator, that receives fuel vapor from a vent of the fuel vapor separator. In order to prevent the flow of liquid fuel into and out of the additional fuel chamber, a valve is provided which is able to block the vent of the additional chamber. In addition, a sensor is provided to provide a signal that represents a condition in which liquid fuel within the additional fuel chamber exceeds a predetermined level.

The patents described above are hereby expressly incorporated by reference in the description of the present invention.

Marine propulsion devices occasionally experience vapor lock conditions in which fuel vaporizes to a gaseous state and is difficult to pump from a fuel storage system to the engine. Various techniques have been used to cool the fuel in order to avoid this deleterious condition. It would be significantly beneficial if a simplified system could be provided to remove heat from the fuel in order to avoid this situation.

SUMMARY OF THE INVENTION

A fuel system for a marine propulsion device, made in accordance with the preferred embodiment of the present invention, comprises an engine and fuel storage reservoir configured to contain fuel for use by the engine. The fuel storage reservoir is connected in fluid communication with the engine. The present invention further comprises a Peltier-effect device disposed in thermal communication with the fuel in order to remove heat from the fuel.

The present invention also comprises a fuel pumping module connected in fluid communication between the fuel storage reservoir and the engine. A low pressure fuel conduit is connected in fluid communication between the fuel reservoir and the fuel pumping module. The Peltier-effect device is connected in thermal communication with the low pressure fuel conduit. A high pressure fuel conduit is connected in fluid communication between the fuel pumping module and the engine. The Peltier-effect device is connected in thermal communication with a high pressure fuel conduit. In certain embodiments, both the low pressure fuel conduit and the high pressure fuel conduit are simultaneously connected in thermal communication with the cold side, or heat removing side, of the Peltier-effect device.

The present invention can further comprise a secondary heat exchanger that is connected in thermal communication with the Peltier-effect device. The secondary heat exchanger connects the Peltier-effect device in thermal communication with a stream of water. A water pump is connected in fluid communication with the Peltier-effect device to cause the stream of water to flow from a body of water through the secondary heat exchanger. The body of water is a body of water in which the marine propulsion device is operated. A fuel rail is connected in fluid communication with the fuel storage reservoir in order to distribute fuel to a plurality of cylinders of the engine. A fuel filter is connected in fluid communication between the fuel storage reservoir and the engine. In a preferred embodiment, the marine propulsion device is an outboard motor.

A heat exchange conduit is connected in thermal communication with the Peltier-effect device in order to direct a flow of fuel through the heat exchange conduit in thermal communication with a cold side of the Peltier-effect device. The fuel pumping module comprises a lift pump and a high pressure pump in a preferred embodiment of the present invention. The lift pump is connected in fluid communication between the fuel pumping module and the fuel storage reservoir and the high pressure pump is connected in fluid communication between the fuel pumping module and the engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
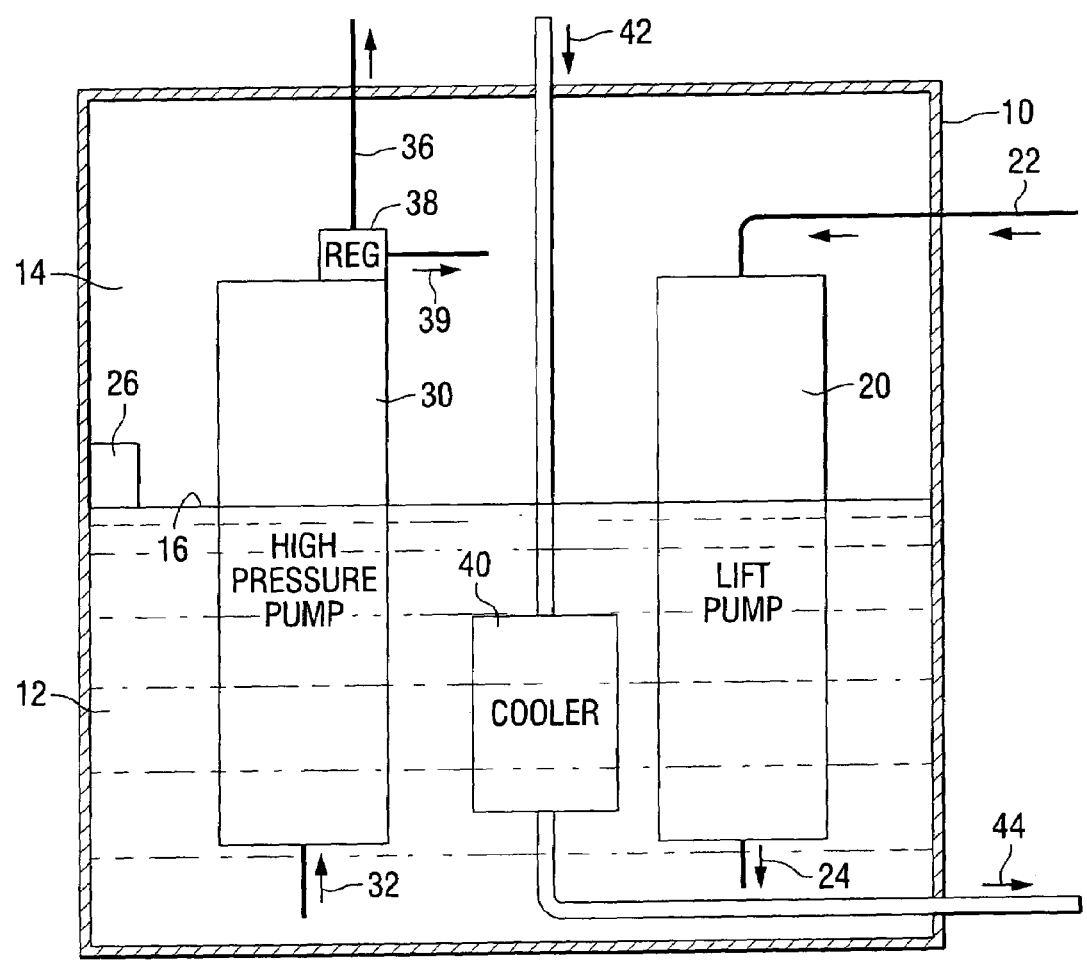
FIG. 1 is a simplified schematic representation of a fuel system module.

Throughout the description of the preferred embodiment of the present invention, like components will be identified by like reference numerals.

In order to fully understand the preferred embodiment of the present invention, it is helpful to understand that it can be used in conjunction with a fuel pumping module, or fuel systems module. FIG. 1 is a simplified representation of a fuel system module 10. It contains an amount of liquid fuel 12 with a gaseous ullage 14 above the surface 16 of liquid fuel. A lift pump 20 draws fuel, as represented by arrow 22, from a fuel storage reservoir to maintain the liquid fuel 12 at the level 16 shown in FIG. 1. The lift pump directs the flow of fuel, as represented by arrow 24, into the cavity of the fuel system module 10. In certain embodiments, a liquid level switch 26 is used to activate and deactivate the lift pump 20 in order to maintain the level 16 at a desired height.

With continued reference to FIG. 1, a high pressure pump 30 draws liquid fuel 12, as represented by arrow 32, and pumps it, as represented by arrow 36, to a fuel rail of an engine as will be described in greater detail below. A regulator 38 maintains a preselected pressure in line 36 by allowing excess fuel to flow back to the liquid fuel 12, as represented by arrow 39.

With continued reference to FIG. 1, a cooler 40, which can comprise a cooling coil, is provided within the fuel system module 10. It receives a flow of water, as represented by arrow 42, through the conduit of the coil and the cooling water is then expelled, as represented by arrow 44, back to a body of water from which it was drawn. The basic structure and operation of the fuel system module is described above in U.S. Pat. Nos. 6,527,603 and 6,390,871. Although the use of the fuel system module such as that illustrated in FIG. 1 is not a requirement in all embodiments of the present invention, a preferred embodiment will be described below in terms of its relationship to a fuel system module.

Figure 2:
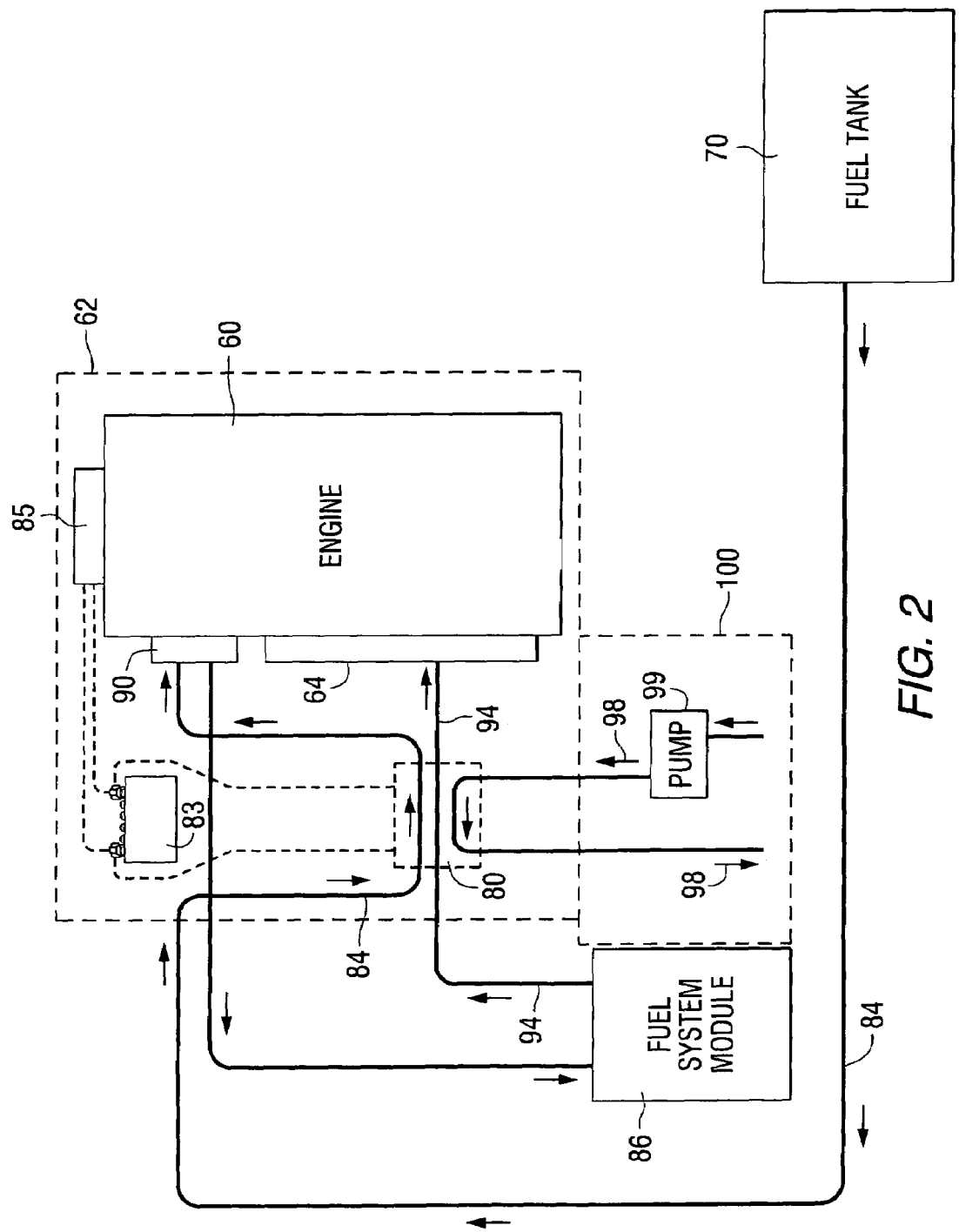
FIG. 2 is a schematic representation of a marine propulsion system utilizing the present invention.

FIG. 2 is a schematic representation of a marine propulsion device. An engine 60 is provided under a cowl portion 62, which is represented by a dashed line in FIG. 2, and is provided with a fuel rail 64. A fuel storage reservoir 70 is configured to contain fuel for use by the engine 60. The fuel storage reservoir 70 is connected in fluid communication with the engine 60, as shown. A Peltier-effect device 80 is disposed in thermal communication with the fuel in order to remove heat from the fuel. In FIG. 2, the Peltier-effect device 80 is connected in electrical communication with a battery 83 in order to obtain DC power. It is also connected to an alternator 85 which provides electrical power when the engine 60 is operating. Although not limiting to the scope of the present invention, the Peltier-effect device 80 obtains electrical power from either the battery 83 or the alternator 85 in a preferred embodiment. The battery 83 and the alternator 85 are not illustrated in the embodiment shown in FIG. 6, as will be described in greater detail below, but it should be understood that these alternative sources of electrical power are used in that embodiment also.

A low pressure fuel conduit 84 is connected in fluid communication between the fuel storage reservoir and a fuel pumping module 86. The Peltier-effect device 80 is connected in thermal communication with the low pressure fuel conduit 84. As shown in FIG. 2, the low pressure fuel conduit 84 extends from the fuel storage reservoir 70 to a fuel filter 90 which is disposed proximate the engine 60. The low pressure fuel conduit 84 passes in thermal communication with the Peltier-effect device 80 prior to flowing to the fuel filter 90.

A high pressure fuel conduit 94 is connected in fluid communication between the fuel pumping module 86 and the engine 60. More specifically, it is connected between the fuel pumping module 86 and the fuel rail 64 which provides fuel to the cylinder of the engine 60. The Peltier-effect device 80 is connected in thermal communication with a high pressure fuel conduit 94, as shown in FIG. 2. In the embodiment illustrated in FIG. 2, both the low pressure fuel conduit 84 and the high pressure fuel conduit 94 are disposed in thermal communication with the Peltier-effect device 80 to remove heat from the fuel as it passes through the Peltier-effect device on its way to either the fuel filter 90 or the fuel rail 64.

With continued reference to FIG. 2, those skilled in the art of Peltier-effect devices are familiar with the fact that they typically comprise a secondary heat exchanger which is connected in thermal communication with the Peltier-effect device in order to remove heat from the hot side of the device. The secondary heat exchanger is connected in thermal communication with a stream of water to remove heat from it. This stream of water is conducted through conduits that are represented by arrows 98 in FIG. 2. A water pump 99 is connected in fluid communication with the Peltier-effect device in order to cause the stream of water to flow from a body of water in which the marine propulsion system is operating and flow through the secondary heat exchanger portion of the Peltier-effect device 80.

With continued reference to FIG. 2, the dashed line 62 represents the upper portion of an outboard motor. Dashed line 100 represents the lower portion of an outboard motor. The Peltier-effect device 80 can be incorporated within the space under the cowl 62 as shown. Alternatively, it can be incorporated as part of the fuel system module 86 or at any other convenient location in conjunction with the marine propulsion device.

Figure 3:
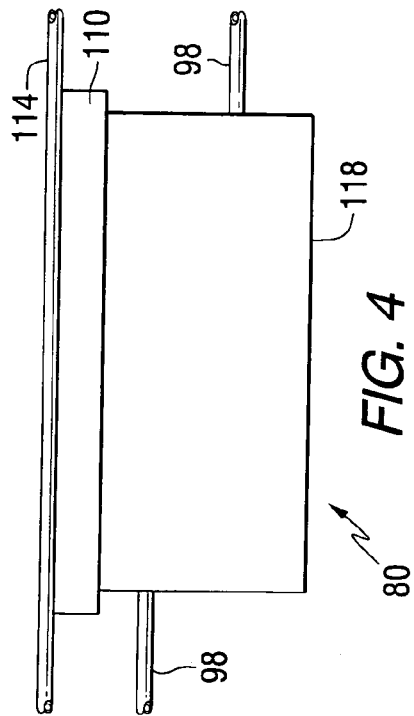
FIG. 3 shows a portion of a thermoelectric device with a fuel conduit attached to its cold surface.

FIG. 3 is a highly simplified representation of a thermoelectric device, such as a Peltier-effect device 80. As is well known to those skilled in the art, a device of this type provides a cold region and a hot region. Calories are removed from the cold region and transferred to the hot region according to the operating principles of the Peltier-effect device. A cold plate 110, or cold portion, is shown in FIG. 3 with a heat exchange conduit 114 attached in thermal communication with the cold plate 110. The heat exchange conduit 114 can be, for example, connected in fluid communication with the low pressure fuel conduit 84 or the high pressure fuel conduit 94. It is shown arranged in a serpentine pattern to increase the thermal communication between the fuel passing through the heat exchange conduit 114 and the cold plate 110.

Figure 4:
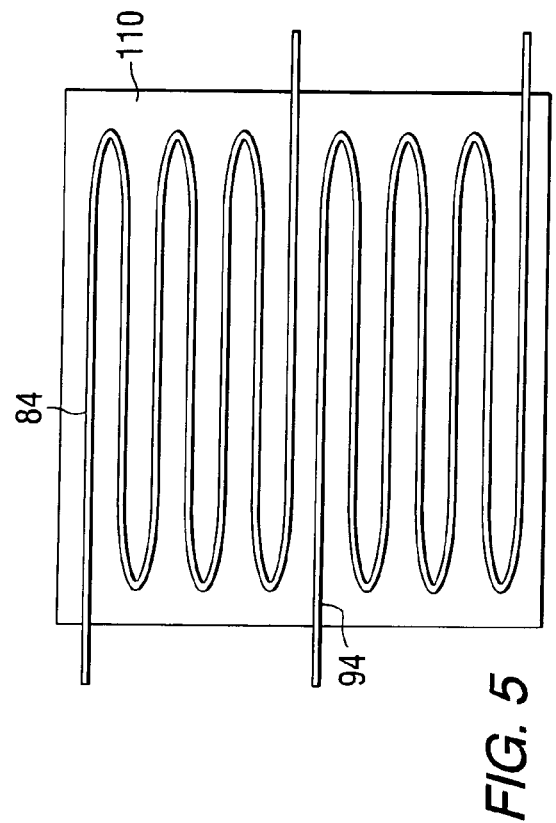
FIG. 4 is a side view of a thermoelectric device showing the secondary heat exchanger in association with the cold portion of the device.

FIG. 4 is the simplified schematic view of a Peltier-effect device 80 with the heat exchange conduit 114 shown attached to a top surface of the cold plate 110. A secondary heat exchanger 118 is provided with a water conduit 98 to remove heat that is transferred from the cold plate 110. Although not shown in FIG. 4, it should be understood that a plurality of thermoelectric elements, of both P-type and N-type semiconductive components, are disposed in the region between the cold plate 110 and the secondary heat exchanger 118. This arrangement is well known to those skilled in the art and described in U.S. Pat. Nos. 3,564,860 and 3,635,037 which are discussed above.

With reference to FIGS. 2, 3, and 4, it can be seen that the Peltier-effect device 80 is arranged so that it can remove heat from the fuel of the fuel system as the fuel passes in thermal communication with the cold plate 110, either in association with the low pressure conduit 84 or the high pressure conduit 94. The water is provided by the pump 99 through conduit 98 to remove that heat from the secondary heat exchanger 118.

Figure 5:
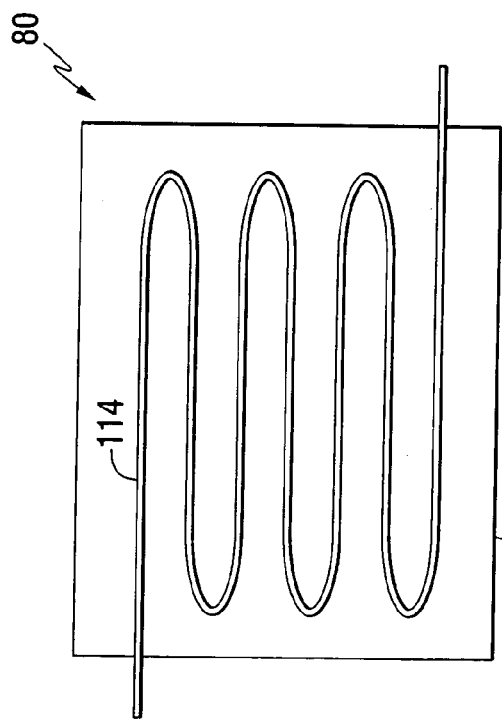
FIG. 5 shows a thermoelectric device with two conduits attached to its cold portion.

FIG. 5 is a simplified schematic representation of a cold plate 110 of a Peltier-effect device on which two heat exchange conduits, 84 and 94, are attached in thermal communication. In the illustration of FIG. 5, the low pressure conduit 84 and the high pressure conduit 94, discussed above in conjunction with FIG. 2, are attached to the cold plate 110 so that heat can be removed simultaneously from fuel flowing through both of these conduits of the fuel system.

Figure 6:
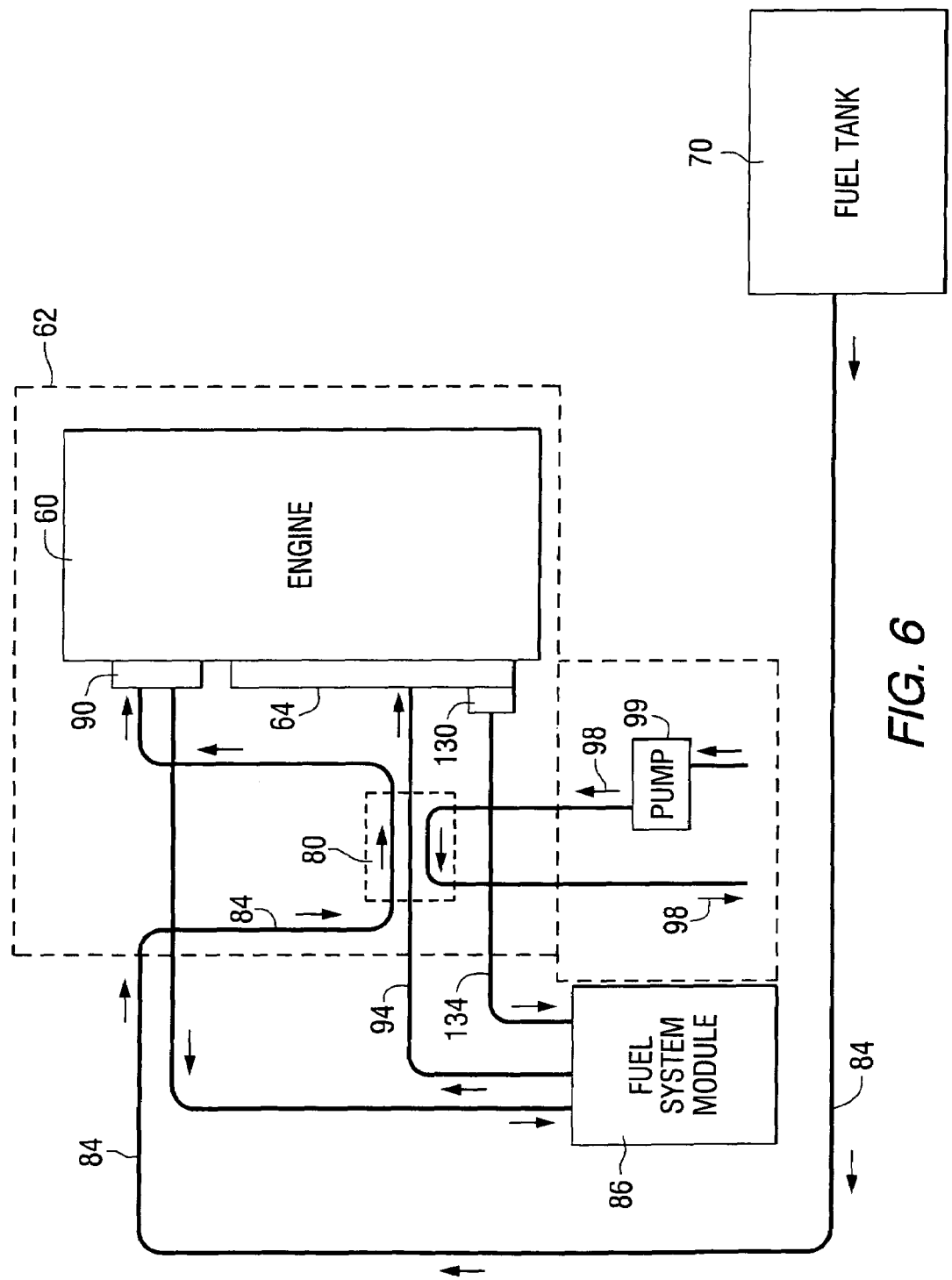
FIG. 6 shows a system, generally similar to that shown in FIG. 2, but with a return conduit from a regulator associated with the fuel rail of an engine.

FIG. 6 is generally similar to FIG. 2, and shows an application of the present invention in conjunction with an engine 60 that provides a pressure regulator 130 associated directly with the fuel rail 64. According to the operation of the system shown in FIG. 6, high pressure fuel is pumped by the fuel system module 86 through the high pressure conduit 94 to the fuel rail 64. The regulator 130 controls the pressure of fuel within the fuel rail 64 and diverts extra fuel through conduit 134 back to the reservoir of fuel within the fuel system module 86, as described above in conjunction with FIG. 1. It should be understood that FIG. 1 does not show the return line 134 within the fuel system module 10 because it illustrates an alternative embodiment that provides a pressure regulator 38 within the containment of the fuel system module associated with a high pressure pump. The particular embodiment of the fuel system module shown in FIG. 1 is intended for use with a fuel rail 64 that is "deadheaded" like the one in FIG. 2 and not with a fuel rail 64 that returns excess fuel to the fuel system module 86 as illustrated in FIG. 6.

With references to FIGS. 1–6, a fuel system for a marine propulsion device made in accordance with the preferred embodiment of the present invention comprises an engine 60 and a fuel storage reservoir 70 that is configured to contain fuel for use by the engine. The fuel storage reservoir 70 is connected in fluid communication with the engine. A thermoelectric device 80, such as a Peltier-effect device, is disposed in thermal communication with the fuel to remove heat from the fuel. A fuel pumping module, such as the fuel system module 86, is connected in fluid communication between the fuel storage reservoir 70 and the engine 60. A low pressure fuel conduit 84 is connected in fluid communication between the fuel storage reservoir and the fuel pumping module 86. The Peltier-effect device 80 is connected in thermal communication with the low pressure fuel conduit 84. A high pressure fuel conduit 94 is connected in fluid communication between the fuel pumping module 86 and the engine 60. The thermoelectric device 80 is connected in thermal communication with the high pressure fuel conduit 94. It should be understood that the low pressure fuel conduit and the high pressure fuel conduit can be individually connected to a thermoelectric device or, alternatively, both of these conduits can be simultaneously connected to a common thermoelectric device. A secondary heat exchanger 118 is connected in thermal communication with the thermoelectric device and it connects the thermoelectric device in thermal communication with a stream of water passing through a conduit 98. A water pump 99 is connected in fluid communication with the thermoelectric device to cause the stream of water to flow from a body of water in which the marine propulsion device is operated and through the secondary heat exchanger 118. A fuel rail 64 is connected in fluid communication with the fuel storage reservoir 70 to distribute fuel to a plurality of cylinders of the engine 60. A fuel filter 90 is connected in fluid communication between the fuel storage reservoir 70 and the engine 60. The marine propulsion device can be an outboard motor in a preferred embodiment of the present invention.

A heat exchange conduit 114 is connected in thermal communication with a cold plate 110 of the thermoelectric device 80 to direct a flow of the fuel through the heat exchange conduit 114 in thermal communication with the cold side of the thermoelectric device 80. The fuel pumping module 86 can comprise a lift pump 20 and a high pressure pump 30. The lift pump is connected in fluid communication between the fuel pumping module 86, which is also identified by reference numeral 10 in FIG. 1, and the fuel storage reservoir 70. The high pressure pump 30 is connected in fluid communication between the fuel pumping module 86 and the engine 60. As described above, in a preferred embodiment of the present invention, the thermoelectric device is a Peltier-effect device.

Although the present invention has been described in particular detail and illustrated to show a preferred embodiment, it should be understood that alternative embodiments are also within its scope.

I claim:

1. A fuel system for a marine propulsion device, comprising:
    an engine;
    a fuel storage reservoir configured to contain fuel for use by said engine, said fuel storage reservoir being connected in fluid communication with said engine;
    a Peltier-effect device disposed in thermal communication with said fuel to remove heat from said fuel; and
    a secondary heat exchanger connected in thermal communication with said Peltier-effect device, said secondary heat exchanger connecting said Peltier-effect device in thermal communication with a stream of water.

2. The fuel system of claim 1, further comprising:
    a fuel pumping module connected in fluid communication between said fuel storage reservoir and said engine.

3. The fuel system of claim 2, further comprising:
    a low pressure fuel conduit connected in fluid communication between said fuel storage reservoir and said fuel pumping module, said Peltier-effect device being connected in thermal communication with said low pressure fuel conduit.

4. The fuel system of claim 2, further comprising:
    a high pressure fuel conduit connected in fluid communication between said fuel pumping module and said engine, said Peltier-effect device being connected in thermal communication with said high pressure fuel conduit.

5. The fuel system of claim 2, further comprising:
    a low pressure fuel conduit connected in fluid communication between said fuel storage reservoir and said fuel pumping module, said Peltier-effect device being connected in thermal communication with said low pressure fuel conduit; and
    a high pressure fuel conduit connected in fluid communication between said fuel pumping module and said engine, said Peltier-effect device being connected in thermal communication with said high pressure fuel conduit.

6. The fuel system of claim 1, wherein:
    said marine propulsion device is attachable to a marine vessel.

7. The fuel system of claim 6, further comprising:
    a water pump connected in fluid communication with said Peltier-effect device to cause said stream of water to flow from a body of water, on which said marine vessel is operable, through said secondary heat exchanger.

8. The fuel system of claim 1, further comprising:
    a fuel rail connected in fluid communication with said fuel storage reservoir to distribute said fuel to a plurality of cylinders of said engine.

9. The fuel system of claim 8, further comprising:
    a fuel filter connected in fluid communication between said fuel storage reservoir and said engine.

10. The fuel system of claim 1, wherein:
    said marine propulsion device is an outboard motor.

11. The fuel system of claim 1, further comprising:
    a heat exchange conduit connected in thermal communication with said Peltier-effect device to direct a flow of said fuel through said heat exchange conduit in thermal communication with a cold side of said Peltier-effect device.

12. The fuel system of claim 2, wherein:
    said fuel pumping module comprises a lift pump and a high pressure pump.

13. The fuel system of claim 12, wherein:
    said lift pump is connected in fluid communication between said fuel pumping module and said fuel storage reservoir; and
    said high pressure pump is connected in fluid communication between said fuel pumping module and said engine.

14. A fuel system for a marine propulsion device, comprising:
    an engine;
    a fuel storage reservoir configured to contain fuel for use by said engine, said fuel storage reservoir being connected in fluid communication with said engine;
    a Peltier-effect device disposed in thermal communication with said fuel to remove heat from said fuel;
    a secondary heat exchanger connected in thermal communication with said Peltier-effect device, said secondary heat exchanger connecting said Peltier-effect device in thermal communication with a stream of water;
    a fuel pumping module connected in fluid communication between said fuel storage reservoir and said engine;
    a low pressure fuel conduit connected in fluid communication between said fuel storage reservoir and said fuel pumping module, said Peltier-effect device being connected in thermal communication with said low pressure fuel conduit;

a high pressure fuel conduit connected in fluid communication between said fuel pumping module and said engine, said Peltier-effect device being connected in thermal communication with said high pressure fuel conduit.

15. The fuel system of claim 14, wherein:

said marine propulsion device is attachable to a marine vessel.

16. The fuel system of claim 15, further comprising:

a water pump connected in fluid communication with said Peltier-effect device to cause said stream of water to flow from a body of water, on which said marine vessel is operable, through said secondary heat exchanger.

17. The fuel system of claim 16, further comprising:

a fuel rail connected in fluid communication with said fuel storage reservoir to distribute said fuel to a plurality of cylinders of said engine.

18. The fuel system of claim 17, further comprising:

a heat exchange conduit connected in thermal communication with said Peltier-effect device to direct a flow of said fuel through said heat exchange conduit in thermal communication with a cold side of said Peltier-effect device.

19. The fuel system of claim 18, wherein:

said fuel pumping module comprises a lift pump and a high pressure pump.

20. The fuel system of claim 19, wherein:

said lift pump is connected in fluid communication between said fuel pumping module and said fuel storage reservoir; and said high pressure pump is connected in fluid communication between said fuel pumping module and said engine.

* * * * *